United States Patent [19]

Kaczmarek et al.

[11] Patent Number: 4,907,120
[45] Date of Patent: Mar. 6, 1990

[54] LINE PROTECTOR FOR A COMMUNICATIONS CIRCUIT

[75] Inventors: Richard Kaczmarek, Chicago; William L. Weber, Buffalo Grove, both of Ill.

[73] Assignee: Reliance Comm/Tec Corporation, Chicago, Ill.

[21] Appl. No.: 282,003

[22] Filed: Dec. 8, 1988

[51] Int. Cl.$^4$ .............................................. H02H 9/04
[52] U.S. Cl. ................................... 361/119; 361/120; 337/32; 337/34
[58] Field of Search ................ 361/56, 117, 118, 119, 361/120, 103, 106; 337/32, 34; 338/22 R, 27

[56] References Cited

U.S. PATENT DOCUMENTS

| | | | |
|---|---|---|---|
| 3,975,664 | 8/1976 | Baumbach | 317/66 |
| 4,262,317 | 4/1981 | Baumbach | 361/124 |
| 4,327,393 | 4/1982 | Hines et al. | 361/120 |
| 4,729,055 | 3/1988 | Dorival et al. | 361/119 |

Primary Examiner—Derek S. Jennings
Attorney, Agent, or Firm—Michael M. Rickin

[57] ABSTRACT

A line protector for a communications circuit. The protector has a three electrode gas tube, the end electrodes of which are connected to the protector's line input terminals. The middle electrode of the tube is connected to the protector's ground terminal. Decoupling devices such as positive temperature coefficient resistors are connected in series between the line input terminals and the protector's equipment terminals. The protector also includes an additional overvoltage arrestor in the form of two diodes connected between the protector's ground terminal and the equipment terminals. The diodes have a lower voltage rating than the gas tube. A conductive clip which is in firm engagement with the protector's ground terminal is used to removably hold the diodes.

17 Claims, 4 Drawing Sheets

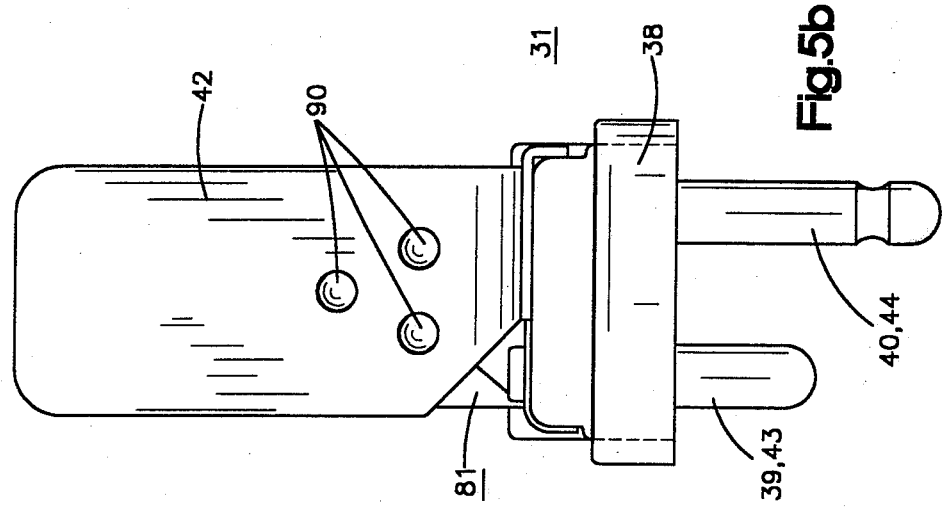
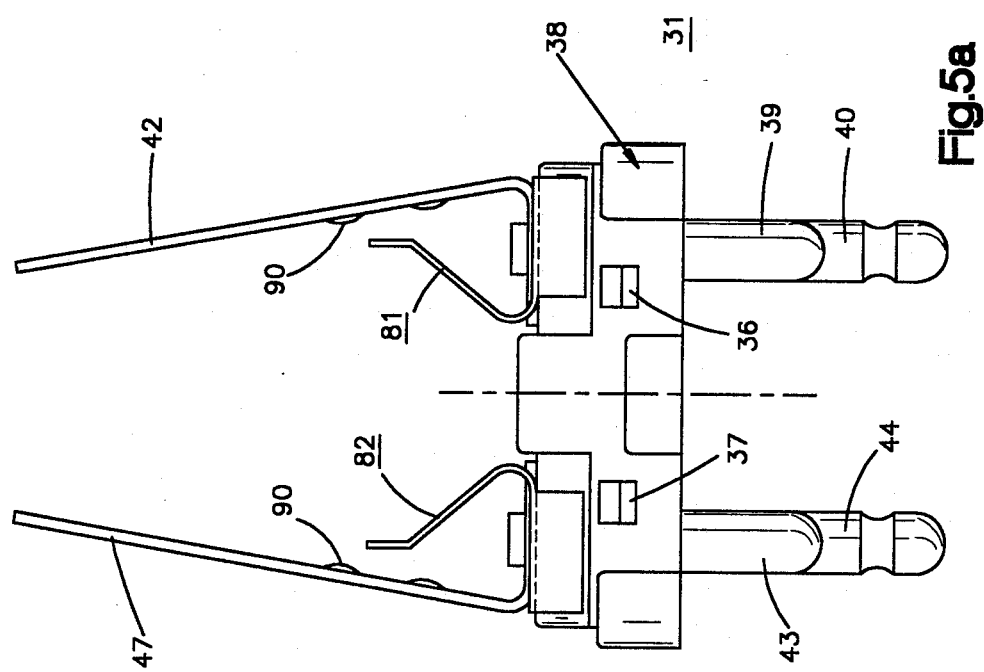

LINE PROTECTOR FOR A COMMUNICATIONS CIRCUIT

CROSS-REFERENCE TO RELATED APPLICATION

Of interest is copending U.S. patent application Ser. No. 07/281,492 (hereinafter the '492 application) filed of even date herewith and also entitled "Line Protector for a Communications Circuit" which describes a protector module that uses a three element gas tube protector element to provide overvoltage and sustained overcurrent protection and solid state devices to provide protection against marginal overcurrents.

BACKGROUND OF THE INVENTION

1. Field of the Invention

The present invention relates to protector modules which are used in various locations such as telephone central offices to protect the inside equipment from damage as a result of overvoltage and overcurrent conditions that may occur on the incoming lines and more particularly to such a module which uses a gas tube and solid state devices such as diodes to provide overvoltage protection in combination with other solid state devices such as positive temperature coefficient resistors (PTCRs) to provide overcurrent protection.

2. Description of the Prior Art

There are many well known modules which are used at telephone company central offices and increasingly at other locations to provide protection against any overvoltage and overcurrent conditions that may occur on the telephone line pair. One example of such a module is that shown in U.S. Pat. No. 3,975,664 (hereinafter the '664 patent) which is assigned to the same assignee as is the present invention.

The module described in the '664 patent uses a three element cold cathode gas tube to provide protection against an overvoltage condition on the telephone line pair to which the module is connected. Protection against a sustained overcurrent condition on the line pair is provided by having slugs of low melting point solder in contact with the end terminals of the gas tube. The occurrence of a sustained overcurrent condition on either line of the line pair protected by the module causes the associated slug to melt. The melting of the slug allows the associated end terminal of the gas tube to come in contact with the ground terminal of the module. A more detailed description of how the module shown in the '664 patent provides overvoltage and sustained overcurrent may be obtained by referring to that patent.

The module described in the '664 patent does not provide protection against a marginal overcurrent condition. Therefore, it should not be used with those line pairs where such a condition may occur.

As discussed in the '664 patent, the module disclosed therein has certain advantages. Among them are the elimination of a spring to carry large overcurrents of long duration, relatively short current paths, standard 5 pin base, ease of assembly and its relatively small and compact configuration. It is desirable that such a module also be capable of protecting against marginal overcurrents.

The '492 application describes a protector module of the type disclosed in the '664 patent which uses solid state devices such as PTCRs to provide protection against marginal overcurrents. The use of such devices is desirable in that upon the occurrence of the overcurrent condition, the device does not permanently ground the telephone line. Rather the resistance of the device increases to limit the current. Upon the cessation of the overcurrent condition, the resistance of the PTCR returns to its ambient temperature value and the device is then ready for the occurrence of the next overcurrent condition.

It is also desirable that a protector module of the type disclosed in the '492 application include, in addition to gas tube protector element, solid state devices such as diodes which also function to protect against overvoltages. Typically, such solid state devices have a lower voltage rating than the gas tube protector element. While it is possible to design gas tube protector elements which have such lower voltage ratings this means that the gas tube may operate more frequently than if it has a higher rating. The more times that a gas tube operates, the more likely it is that the performance characteristics of the tube may be degraded. Protector modules which include both gas tube protector elements and solid state devices for overvoltage protection are described in U.S. Pat. Nos. 4,262,317 and 4,729,055. The '317 patent is assigned to the same assignee as is the present invention.

SUMMARY OF THE INVENTION

A line protector for a communications circuit. The line protector includes an overvoltage arrestor which has first and second electrodes connected to line input terminals. The arrestor has a third electrode intermediate the first and second electrodes. The third electrode is connected to a ground terminal.

The protector also includes decoupling devices. The decoupling devices are connected in series between the first and second line input terminals and first and second equipment terminals, respectively.

The protector further includes a conductive clip which is in electrical connection with the ground terminal. The clip includes an initial overvoltage protector which has a ground terminal that is connected by the clip to the line protector ground terminal. The initial overvoltage protector also has first and second terminals which are in electrical connection with the first and second equipment terminals, respectively.

DESCRIPTION OF THE DRAWINGS

FIGS. 5a and 5b are front and side views, respectively, of the base assembly of the module of the present invention.

DESCRIPTION OF THE PREFERRED EMBODIMENT

Figures 1, 1A:
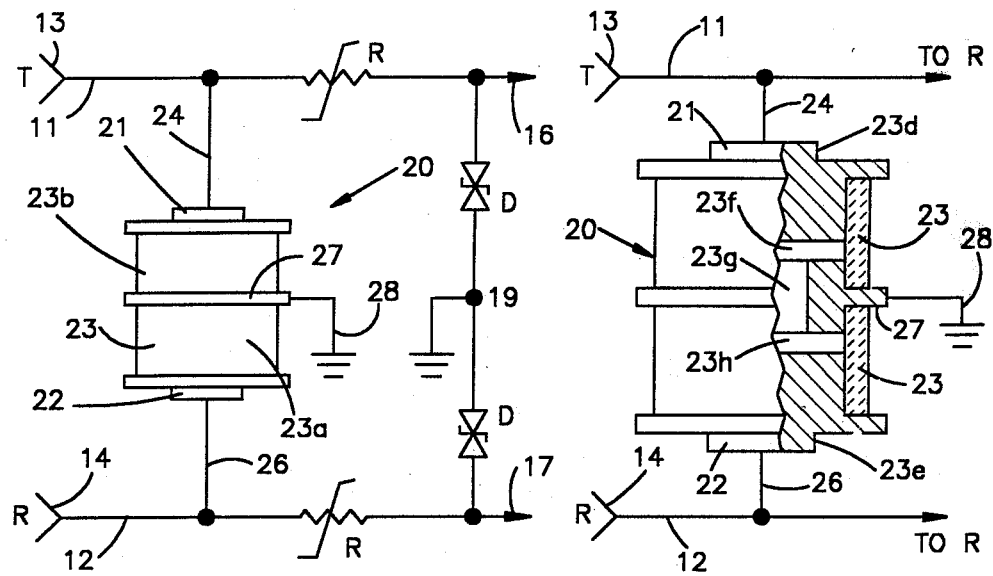
FIG. 1 is a simplified schematic diagram illustrating a telephone line pair with a protector device connecting each line to ground in an overvoltage and/or overcurrent condition.
FIG. 1a shows certain structural features of the gas tube surge voltage arrester.

Referring now to FIG. 1, there is shown a simplified circuit of a telephone line pair, i.e., tip (T) and ring (R), with the protector module of the present invention illustrated somewhat diagrammatically and connected therebetween. As FIG. 1 is, except as otherwise described below, identical to FIG. 1 of the '492 application, the same reference numerals are used to identify the same elements. It is not necessary to describe how three element gas tube protector element 20 provides a connection to ground for a sustained overvoltage appearing either on tip line 11 at terminal 13 or ring line 12 at terminal 14 as the '664 patent provides such an explanation (which is expressly incorporated herein by reference). In any case the operation of the three element gas tube protector element in the circuit shown in FIG. 1 is now very well known to those skilled in the art.

FIG. 1a shows a partial section view of the gas tube protector element 20. It is substantially similar to FIG. 8 of the '664 patent. The body portion 23 provides two gas chambers 23f and 23h. Chamber 23f is in communication with chamber 23h through aperture 23g. Gas tube 20 has a first electrode 23d which is connected to line 11, a second electrode 23e which is connected to line 12 and a center electrode 27 which is connected to ground. The spacing between electrodes 27 and 23c, and 27 and 23e determines, among other things, the voltage at which the gas tube will breakdown and conduct.

As described in the '492 application the junction of tip line and conductor 24 and the junction of ring line 12 and conductor 26 are each connected to terminal 16 and terminal 17, respectively by a resistor R which has a positive temperature coefficient, i.e., R is a PTCR. The flow of current in either line 11 or line 12 causes the associated PTCR to dissipate power. As a result, the temperature of the PTCR rises. When the temperature has risen to the point at which the resistance of the PTCR abruptly increases by several orders of magnitude, the amplitude of the current is limited to a safe level. In this manner, the equipment, be it a switch or telephone, connected to terminals 16 and 17 is protected from excessive current.

Of course, it should be appreciated that if the flow of current through either PTCR is due to an overvoltage condition which is sufficient to cause the associated portion of gas tube 20 to connect the line on which the condition has occurred to ground, then the current will flow to ground. If the overcurrent is sustained, then the associated solder slug in the gas tube protector element will melt. The melting of the slug allows the associated end cap of the protector element to be urged into permanent engagement with ground thereby causing the associated line to be permanently connected to ground.

The circuit of FIG. 1 of the present invention further includes the series combination of two diodes D which combination is connected across the terminals 16 and 17. The center point 19 of the series combination is connected to ground. The diodes D are each selected to have the same voltage rating which is lower than the voltage rating of the gas tube protector element 20. Each of the PTCRs are connected in series between an associated one of the end terminals 21, 22 of protector element 20 and the associated one of the diodes D. The PTCRs R provide sufficient voltage drop so that the voltage across the end terminals rises when the amplitude of the current passing through the diodes D increases. This rise in voltage may be sufficient to allow element 20 to conduct and take over protection from the diodes. The PTCRs R also provide protection against marginal overcurrents as described above. As described in the aforementioned U.S. Pat. No. 4,729,055, the diodes D may be considered to provide initial protection against overvoltages and the PTCRs R may be considered to be decoupling means as well as protecting against marginal overcurrents.

In one embodiment for the module of the present invention, the diodes D were selected with a rating of 75V while element 20 was selected with a rating of 400V. By selecting the diodes with such a voltage rating they then can be caused to conduct and connect the associated line to ground by the occurrence on that line of voltages which exceed the normal voltages but do not exceed the voltage rating of the gas tube element 20.

Figure 2:
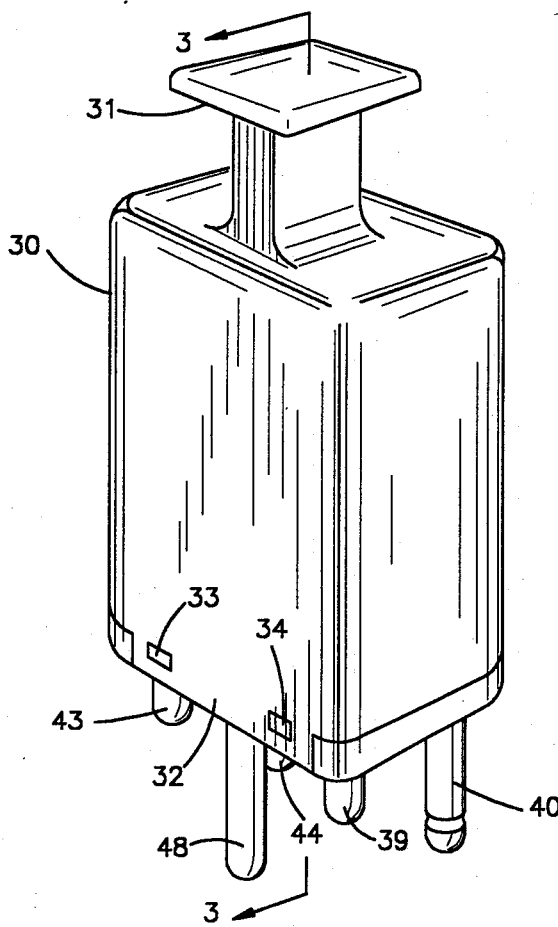
FIG. 2 is an exterior perspective view of the protector housing and base of this invention wherein the protector unit is contained.

Referring now to FIG. 2, there is shown an exterior perspective view of the housing 30 for the protector module of the present invention. As FIG. 2 is identical in all respects to FIG. 2 of the '664 patent, the same reference numerals used therein are used herein. Extending from the base 38 (see FIG. 3) of housing 30 are the equipment pins 39 and 43, the line pins 40 and 44, and the ground pin 48. As is well known in the art, the equipment pins are electrically connected to the T and R lines of the line pair for the equipment to be protected while the line pins are electrically connected to the T and R lines of the incoming line pair.

Figure 3:
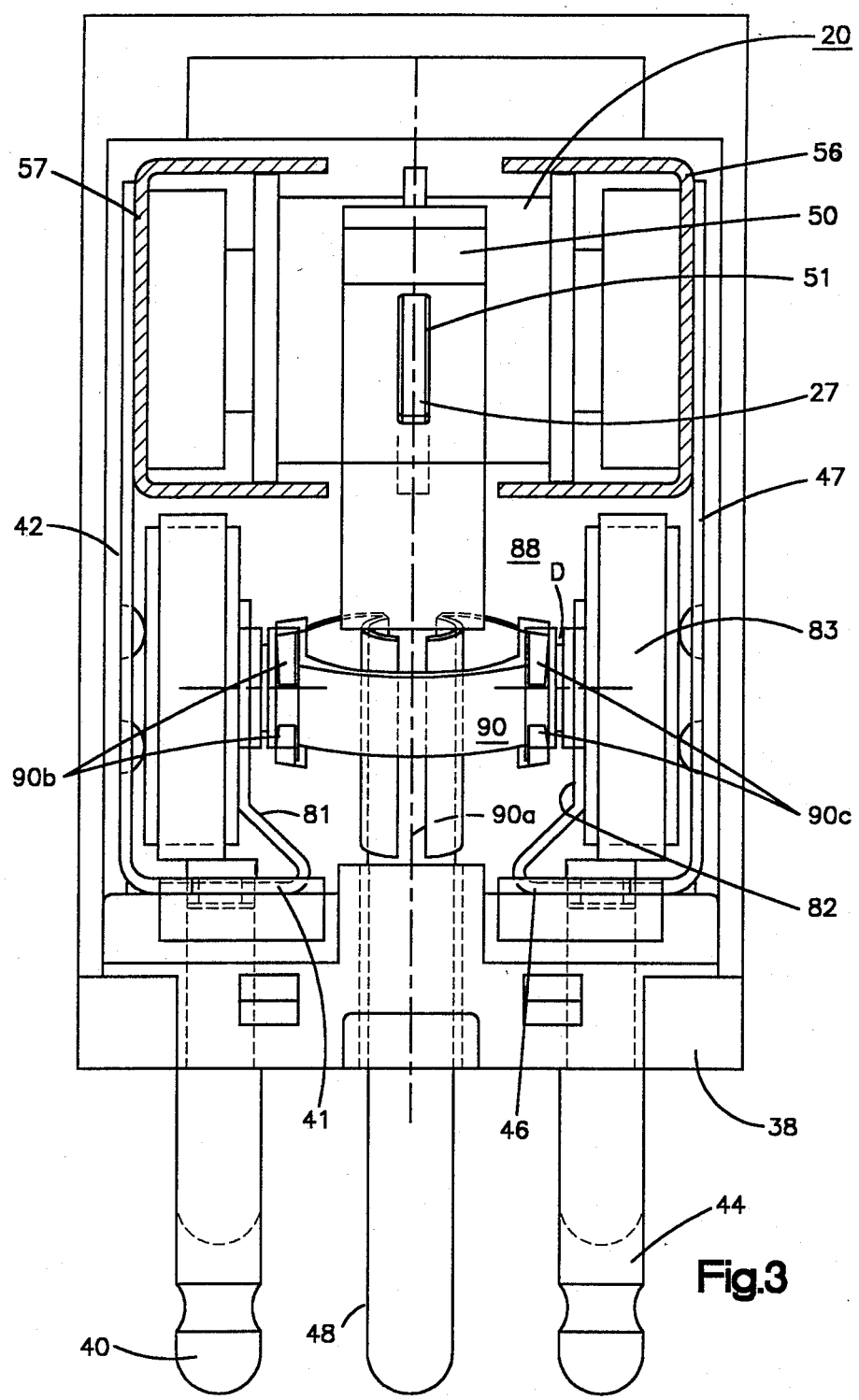
FIG. 3 is a sectional view on an enlarged scale taken along line 3—3 of FIG. 2 showing the protector structure and mounting terminal clips associated therewith.

Referring now to FIG. 3, there is shown on an enlarged scale a sectional view of the protector module of the present invention. As FIG. 3 is, except as otherwise described below, identical to FIG. 3 of the '492 application, the same reference numerals are used to identify the same elements. As with the module of the '492 application, the module of the present invention includes first and second leaf spring connector elements 42 and 47 which makes contact with end caps 57 and 56, respectively of the gas tube element 20. In addition, the module of the present invention also includes, as does the module of the '492 application, a clip member 50 at one end of ground pin 48. Member 50 has window or cutout 51 for firmly engaging the center or ground terminal 27 of protector 20.

In the module of the present invention as with the module of the '492 application, the bent portion 41 of element 42 contacts only pin 40 and the bent portion 46 of element 47 contacts only pin 44. The contacts with pins 39 and 43 are made by leafspring connector elements 81 and 82, respectively. Element 81 is staked to pin 39 and element 82 is staked to pin 43. As is shown most clearly in FIG. 4, it is bent portion 84 of element 81 which is staked to pin 39 and bent portion 85 of element 82 which is staked to pin 43.

Elements 81 and 82 are each in electrical connection with elements 42 and 47, respectively through a PTCR assembly 83. In effect, the elements 42 and 81 cooperate to hold in place one PTCR assembly 83 and elements 47 and 82 cooperate to hold in place another PTCR assembly 83. A comparison of FIG. 3 with the circuit of FIG. 1 shows that elements 42 and 81 cooperate with one PTCR assembly 83 to provide the path for current flow from equipment pin 39 to line pin 40 and elements 47 and 82 cooperate with the other PTCR assembly 83 to provide the path for current flow from equipment pin 43 to line pin 44.

The module of the '492 application does not include the diode assembly 88 of the present invention. That assembly includes grounding clip 90 and the two diodes D. As will be clearer in the exploded perspective of FIG. 4, clip 90 includes channel 90a for firmly engaging that part of the ground terminal 48 of protector 20 which is inside housing 30. The bent portion 74 of terminal 48 typically has an insulating stop sleeve on it and that sleeve is either not used or reduced in length so that channel 90a makes an electrical connection with terminal 48. When the sleeve is not used, clip 90 engages the inside of base 38 to limit the extent of insertion of the protector between elements 42, 47.

Clip 90 also includes first and second sets 90b and 90c of opposed flanges each for retaining a diode D inserted therein. When clip 90 is brought into firm engagement with ground terminal 48 each diode D is brought into electrical connection with ground and the associated one of PTCRs 83a. More specifically, the diode D retained in opposed flanges 90b is electrically connected to ground and the PTCR 83a associated with connector element 81. The diode D retained in opposed flanges 90c is electrically connected to ground and the PTCR 83a associated with connector element 82.

Figure 4:
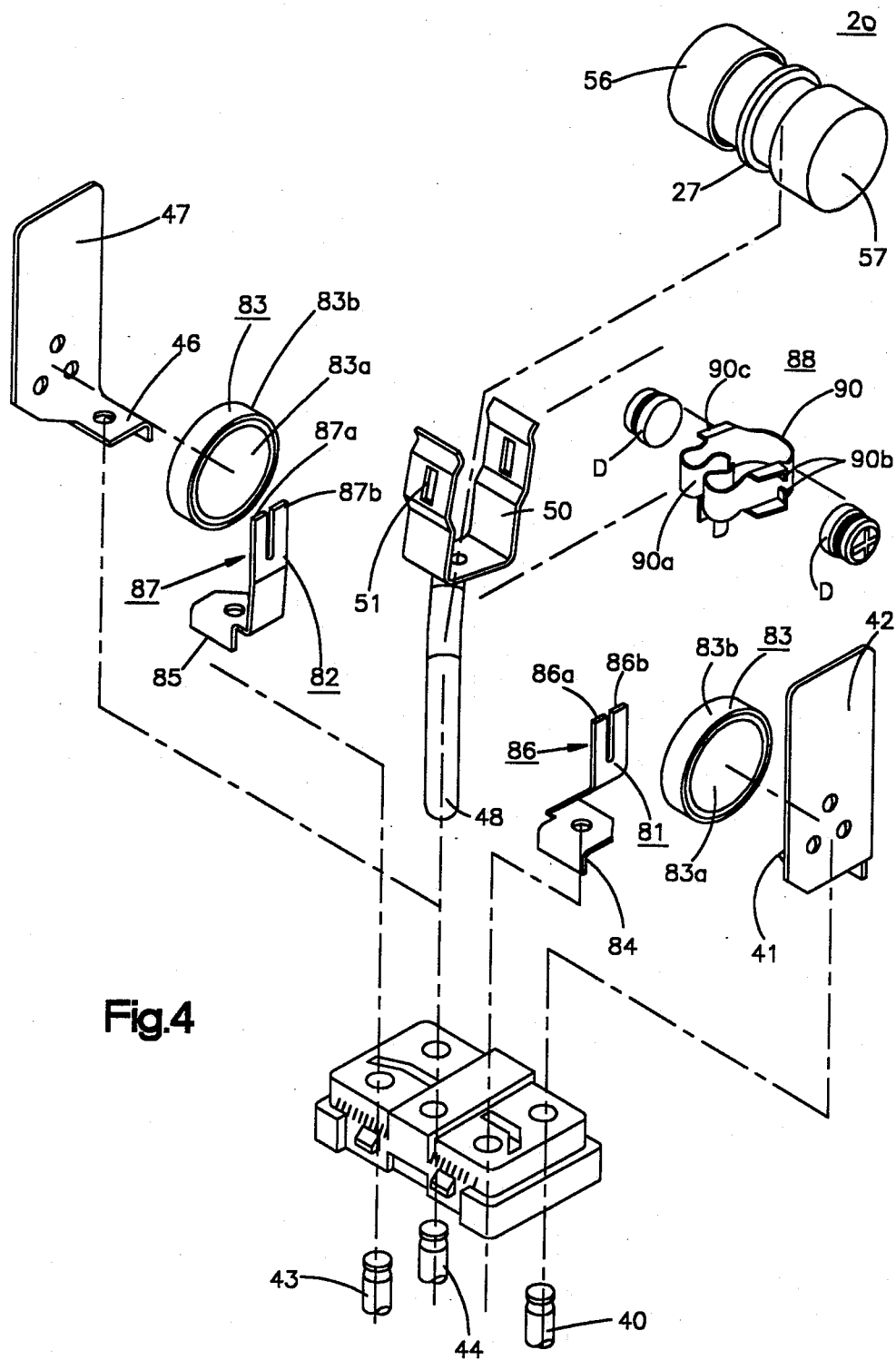
FIG. 4 is an exploded perspective view of the protector unit structure of this invention.

Referring now to FIG. 4, there is shown an exploded perspective view of the protector module of the present invention. For ease of illustration and because it is identical to the housing 30 shown in the '664 patent, the housing is not shown in FIG. 4. In addition, three element gas tube protector element 20 is not shown in exploded form in FIG. 4. It is identical to the protector element 20 of the '664 patent which is shown in exploded form in FIG. 7 of that patent. It is not necessary to describe FIG. 4 in any detail as the function of the elements shown therein should be evident from the discussion above and in particular the discussion of FIG. 3.

PTCR assembly 83 includes a disc PTCR 83a available from a number of manufacturers such as Cera-mite of Grafton, Wisconsin. An insulator 83b in the form of a ring has been placed on the outer edge of the disc 83a. The purpose of the insulator is to ensure that the PTCR makes electrical contact only with the associated connector elements 81, 42 and 82, 47. The lower portion of each of connector elements 42, 47 include three outwardly projecting protuberances 90 which make the electrical contact between the element and one side of the associated one of the PTCRs 83a.

That part of connector elements 81 and 82 which makes contact with the associated one of the two PTCRs 83a are the upwardly projecting portions 86 and 87, respectively. Portions 86 and 87 each have two contacting fingers 86a and 86b for portion 86 and 87a and 87b for portion 87. The fingers provide two points of electrical contact between elements 81, 82 and the associated one of PTCRs 83a. While portions 86 and 87 could each have been designed not to have fingers, i.e., a solid piece, the use of two fingers in each portion is desirable because they have in total lower contact resistance than a solid piece.

In comparing the module of the present invention with that shown in the '664 patent, it is apparent that the connector elements 42 and 47 of the present invention do not have the shape as is shown therefor in the '664 patent. The reason for that difference in shape is that the protector module of the present invention also includes connected to its base, connector elements 81 and 82 which are electrically connected to elements 42 and 47 only through the associated one of the two PTCRs 83a. To ensure that there is no other electrical connection between elements 42 and 81 and elements 47 and 82, it was necessary to modify the shape of elements 42 and 47 from that shown in the '664 patent.

As previously described, diode assembly 88 includes clip 90 and two identical diodes D. Opposed flanges 90b and 90c each retain one diode D inserted therein. Care must be taken in assembling the protector module of the present invention to insure that the diodes D are inserted in their respective opposed flanges in a manner consistent with the circuit of FIG. 1. Upon assembly of the module, the diode D retained in flanges 90b has one end electrically connected by clip 90 to ground terminal 48. The other end of that diode makes contact with fingers 86a and 86b of connector element 81 and therefore it is electrically connected to both the PTCR 83a retained by elements 42 and 81, and equipment pin 39. The diode D retained in flanges 90c has one end electrically connected by clip 90 to ground terminal 48. The other end of that diode makes contact with fingers 87a and 87b of connector element 82 and therefore it is electrically connected to both the PTCR 83a retained by elements 47 and 82, and equipment pin 43.

In order to complete the understanding of the present invention, there is shown in FIGS. 5a and 5b front and side views, respectively, of base 38 of the module in assembled relationship with pins 39, 40, 43, and 44 and connector elements 42, 47, 81 and 82. FIGS. 5a and 5b taken together illustrate the base assembly 31 of the module. In fabricating the module, the base assembly may be separately manufactured. Final assembly of the module then involves inserting one PTCR assembly 83 between elements 42 and 81, another assembly 83 between elements 47 and 82, the bringing of protector element 20 into firm engagement with clip member 50 of ground pin 48, the bringing of assembly 88 into firm engagement with pin 48 and the insertion of pin 48 so assembled into the hole in base 38 therefor. Housing 30 is then placed over the base assembly so that apertures 33 and 34 (see FIG. 2) engage protuberances 36 and 37, respectively, in base assembly 31 (see FIG. 5a).

While the present invention has been described in connection with a protector module which uses leadless PTCRs, it should be appreciated that it may also be used in a module which uses PTCRs having leads for connection to the line and equipment pins. It should further be appreciated that the module may instead of using PTCRs may use either constant resistance resistors or inductors to function as decoupling means without the ability to provide the protection against marginal overcurrents provided by the PTCRs.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

What is claimed is:

1. A line protector for a communications circuit comprising:
    (a) an overvoltage arrestor having first and second electrodes connected between first and second line input terminals and a third electrode intermediate said first and second electrodes connected to a ground terminal;

(b) decoupling means having a resistance which increases substantially when the temperature of said decoupling means rises to a predetermined temperature above ambient temperature, said decoupling means connected in series between said first and second line input terminals and first and second equipment terminals, respectively; and (c) a conductive clip in electrical connection with said ground terminal, said clip including initial overvoltage protection means having a ground terminal connected by said clip to said line protector ground terminal and first and second terminals in electrical connection with said first and second equipment terminals, respectively.

2. The line protector of claim 1 wherein said overvoltage arrestor is of the spark gap type.

3. The line protector of claim 1 wherein said decoupling means is first and second devices, said first device connected in series between said first line input terminal and said first equipment terminal and said second device connected in series between said second line input terminal and said second equipment terminal.

4. The line protector of claim 3 wherein said overvoltage arrestor is of the spark gap type.

5. The line protector of claim 1 wherein said initial overvoltage protection means is a solid state device.

6. The line protector of claim 5 wherein said solid state device is first and second diodes each having a terminal connected to said initial overvoltage protection means ground terminal, said first device also having said initial overvoltage protection means first terminal and said second device also having said initial overvoltage protection means second terminal.

7. The line protector of claim 1 wherein said clip also includes means for removably holding said initial overvoltage protection means.

8. The line protector of claim 6 wherein said clip also includes first means for removably holding said first diode and second means for removably holding said second diode.

9. A line protector for a communications circuit comprising:

(a) an overvoltage arrestor having first and second electrodes connected between first and second line input terminals and a third electrode intermediate said first and second electrodes connected to a ground terminal;

(b) decoupling means having a resistance which increases substantially when the temperature of said decoupling means rises to a predetermined temperature above ambient temperature, said decoupling means connected in series between said first and second line input terminals and first and second equipment terminals, respectively; and (c) a conductive clip in electrical connection with said ground terminal, said clip including means for removably holding an initial overvoltage protection means having a ground terminal connected by said clip to said line protector ground terminal, and first and second terminals connected to said first and second equipment terminals, respectively.

10. The line protector of claim 9 wherein said overvoltage arrestor is of the spark gap type.

11. The line protector of claim 9 wherein said decoupling means is first and second devices, said first device connected in series between said first line input terminal and said first equipment terminal and said second device connected in series between said second line input terminal and said second equipment terminal.

12. The line protector of claim 9 wherein said initial overvoltage protection means is a solid state device.

13. The line protector of claim 12 wherein said solid state device is first and second diodes each having a terminal connected to said initial overvoltage protection means ground terminal, said first device also having said initial overvoltage protection means first terminal and said second device also having said initial overvoltage protection means second terminal.

14. The line protector of claim 13 wherein said clip removably holding means is first means for removably holding said first diode and second means for removably holding said second diode.

15. An initial overvoltage protecting means for use in a line protector, said line protector comprising:

(a) an overvoltage arrestor having first and second electrodes connected between first and second line input terminals and a third electrode intermediate said first and second electrodes connected to a ground terminal;

(b) decoupling means having a resistance which increases substantially when the temperature of said decoupling means rises to a predetermined temperature above ambient temperature, said decoupling means connected in series between said first and second line input terminals and first and second equipment terminals, respectively;

said initial overvoltage protecting means comprising:

(i) a conductive clip having means for engaging said line protector ground terminal; and (ii) an initial overvoltage arresting means having a ground terminal and first and second terminals, said clip also having means for removably holding said initial overvoltage arresting means such that said initial overvoltage arresting means ground terminal is electrically connected to said line protector ground terminal and said first and second terminals are electrically connected to said first and second equipment terminals, respectively, when said clip engages said line protector ground terminal.

16. The initial overvoltage protecting means of claim 15 wherein said initial overvoltage arresting means is a solid state device.

17. The initial overvoltage protecting means of claim 16 wherein said solid state device is first and second diodes each having said initial overvoltage arresting means ground terminal, said first device also having said initial overvoltage arresting means first terminal and said second device also having said initial overvoltage arresting means second terminal.

* * * * *

UNITED STATES PATENT AND TRADEMARK OFFICE
CERTIFICATE OF CORRECTION

PATENT NO. : 4,907,120
DATED : March 6, 1990
INVENTOR(S) : Kaczmarek, et al.

It is certified that error appears in the above—identified patent and that said Letters Patent is hereby corrected as shown below:

In the first or cover page after

"Buffalo Grove," in the list of Inventors, there should be added

-- Wayne Rust, Berwyn, -- and "both" should be deleted and

-- all -- inserted in place thereof.

Signed and Sealed this

Fifth Day of February, 1991

*Attest:*

HARRY F. MANBECK, JR.

*Attesting Officer*          *Commissioner of Patents and Trademarks*